Aug. 21, 1956  C. H. CARLISLE ET AL  2,759,551
SYSTEM FOR SEISMIC EXPLORATION

Filed March 18, 1952  2 Sheets-Sheet 2

INVENTORS.
James A. Smith,
Charles H. Carlisle,
BY Dwight C. Otis
    AGENT.

United States Patent Office 2,759,551
Patented Aug. 21, 1956

2,759,551

SYSTEM FOR SEISMIC EXPLORATION

Charles H. Carlisle, Houston, and James A. Smith, Bellaire, Tex., assignors, by mesne assignments, to Esso Research and Engineering Company, Elizabeth, N. J., a corporation of Delaware Application March 18, 1952, Serial No. 277,232

3 Claims. (Cl. 181—.5)

The present invention pertains to geophysical exploration. More particularly the invention relates to improvements in methods and systems for seismic exploration of geological formations which exist beneath the surface of the earth.

The art of exploring subsurface geological formations by seismic methods has been known for many years. In the early stages of development of this art it became conventional to employ a plurality of seismic wave detectors, or geophones, spaced from each other along a chosen line or profile and to produce an artificial seismic disturbance, usually by detonating a charge of dynamite, or similar explosive, buried in the earth many feet below the surface thereof. The elastic wave energy produced by the disturbance travelled in all directions through the earth from the position of the exploding charge, and rays of this energy were received by the several geophones whereupon the responses of the individual geophones were simultaneously recorded upon a moving record strip as separate traces. Later it became conventional to record as separate traces the responses of several in-line groups of geophones arranged with all of the geophones in each group connected together and spaced relatively short distances, as compared to the spacing between successive groups, along the desired profile line.

While the above described methods and systems of the prior art were successfully employed in many regions and assisted in the discovery of very many petroleum bearing geological formations, it has been found that these methods and systems are practically useless in certain other difficultly explorable regions. While the time of arrival of reflected seismic waves (on which seismic methods of exploration are conventionally based) can sometimes be picked out upon seismic records obtained in these difficultly explorable regions, the times of arrival often are not consistent across the entire record of several traces and, more importantly, cannot be correlated from one record to the next one obtained at an adjacent section of the profile line. The records obtained by prior art methods in these difficult regions do not, therefore, provide useful information from which deductions can be made regarding the depth and dip of subsurface geological strata or formations.

It is, therefore, one object of the present invention to provide an improved method for obtaining useful seismic information in regions which, because of complex geological structure or other causes, have not yielded useful seismic information by methods of the prior art.

A second object of the invention is to provide an improved system which produces useful seismic information when employed in regions which have not yielded useful seismic information by systems of the prior art.

Another object of the invention is to increase the ratio of seismic signal to seismic noise, wherein by definition the term "signal" will be understood to refer to those parts of a recorded seismic disturbance which may be interpreted in terms of geological structure, and the term "noise" will be understood to refer to those parts of the recorded disturbance which cannot be so interpreted. In general, the signal is a seismic wave which has been reflected from a lithogical stratum along a nearly vertical path, while the noise is a summation of waves arriving over substantially nearer horizontal paths, and may include unwanted disturbances crated by extraneous sources.

In its broadest aspect, the method of our invention includes forming an areal pattern comprising a plurality of shot holes drilled into the crust of the earth and spaced from each other around a selected center of disturbance, forming a plurality of mutually similar areal arrays each comprising a plurality of geophones planted upon the surface of the earth and spaced from each other around a selected center of reception, the resulting several centers of reception being spaced selected distances from each other and from said center of disturbance, connecting all of the geophones in each of said areal arrays in electrically additive polarity to form one reception channel per array, placing a suitable charge of explosive in each of the aforementioned shot holes, detonating the charges of explosive in all of said shot holes substantially simultaneously to generate a transient seismic disturbance, and recording wave energy received by each of said areal arrays of geophones.

Stated in another way, the method of our invention includes the steps of generating a transient seismic disturbance simultaneously at a plurality of points uniformly distributed beneath an area of the earth's surface having a minimum dimension at least as large as about one-half the wavelength of longitudinal elastic waves reflected along near-vertical propagation paths in the geological region undergoing exploration, receiving increments of seismic energy at a plurality of points uniformly distributed over at least one reception area spaced from the disturbance area upon the surface of the earth and having a minimum dimension at least as large as about one-half said wavelength, vectorially combining the received increments of energy, and recording successive vectorial sums of the received increments in time spaced relation to the time of generation of the seismic disturbance.

In a more specific form, the method of our invention includes, in addition to the above-mentioned steps, the steps of spacing the plurality of points within the disturbance area at distances not greater than approximately the wavelength of high frequency seismic noise waves propagated along near-horizontal paths in the crust of the earth in the region undergoing exploration, and spacing the plurality of points of reception within the reception area at distances not greater than approximately said last-mentioned wavelength.

Novel features of our invention are set forth with particularity in the appended claims. The invention itself, however, both as to its organization and method of practice, together with additional objects and advantages thereof, will best be understood from the following description of the accompanying drawing in which:

Figure 1A is a schematic diagram representing a modified form of a part of the system illustrated in Figure 1;

Figure 2:
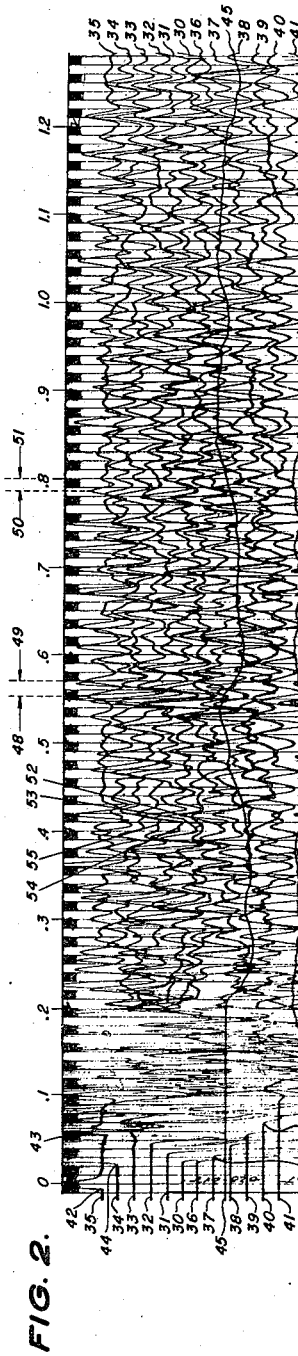
Figure 2 is a photolithographed reproduction of significant portions of a seismic record obtained by a conventional method known in the prior art.
Figure 3:
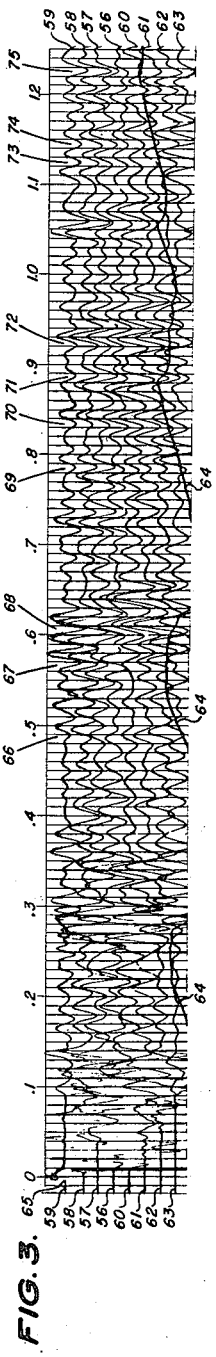
Figure 4:
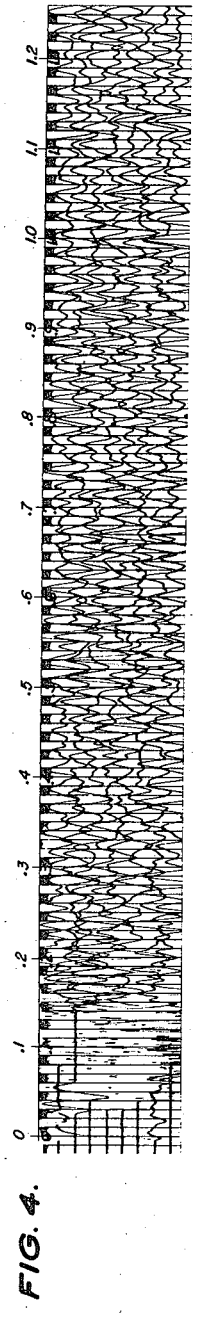
Figure 5:
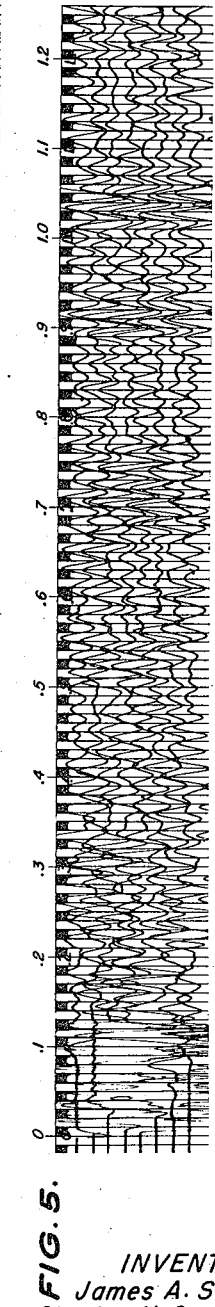

Figure 3 is a similar reproduction of significant portions of a seismic record obtained in accordance with the method of the present invention at the same shot hole station and on the same exploration, or profile, line as the record of Figure 2; and Figures 4 and 5 are reproductions of significant portions of seismic records obtained at identical stations in a different locality from that of Figures 2 and 3 employing the preferred system of our invention, including an areal, or dispersed, seismic disturbance in the production of the record of Figure 5, and employing a single hole, or concentrated, seismic disturbance in the production of the record of Figure 4.

Figure 1:
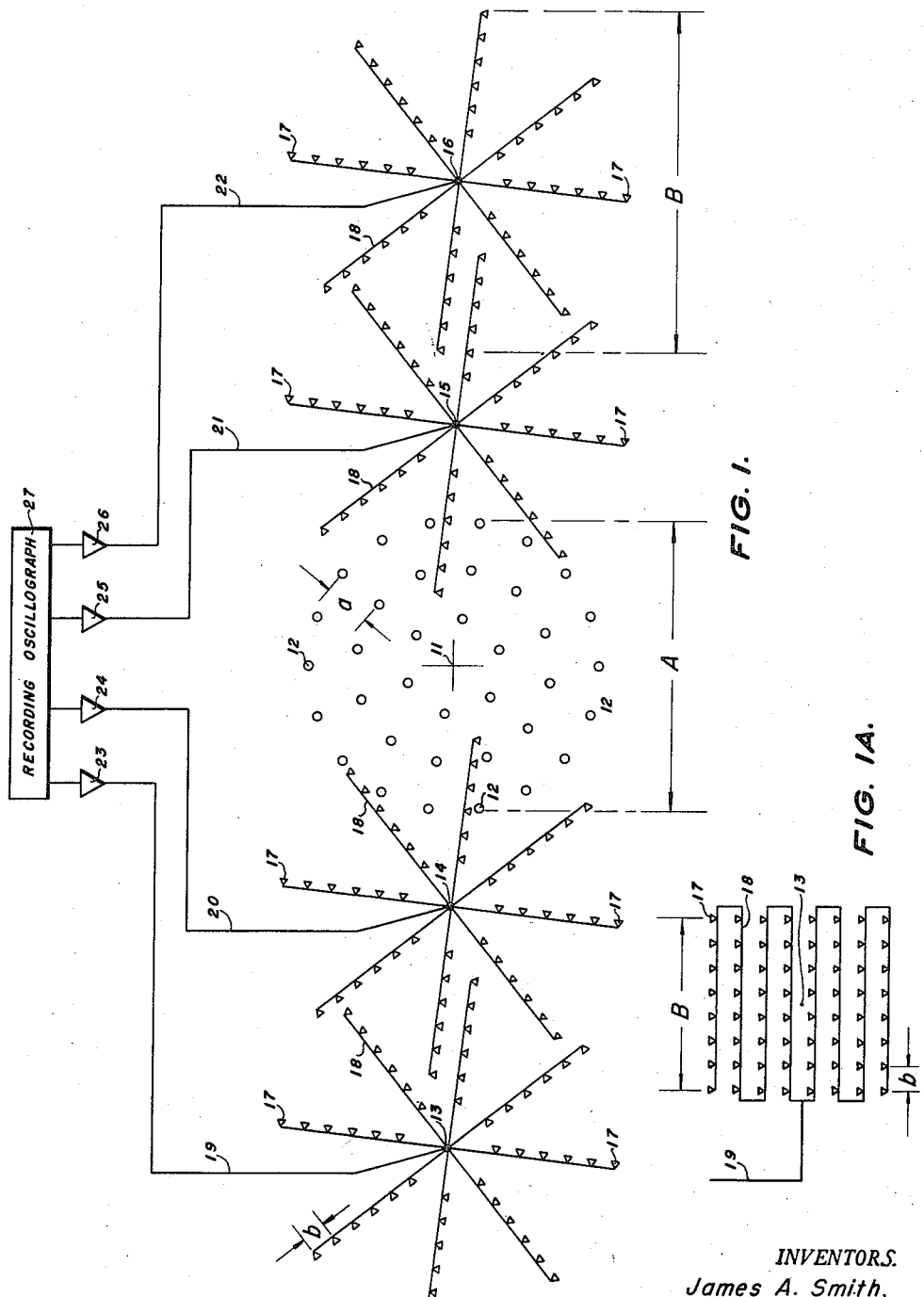
Figure 1 is a schematic diagram representing a preferred system in accordance with our invention.

Referring first to Figure 1, the numeral 11 designates the position of the center of an area for the generation of a seismic disturbance. Symmetrically placed and substantially uniformly spaced throughout an area surrounding center 11 are a plurality of shot holes 12, represented in the drawing by tiny circles. Taken as a group, the plurality of shot holes form an areal pattern centered at 11. In the embodiment shown in Figure 1 the areal pattern consists of three concentric circles having eighteen shot holes uniformly spaced along the circumference of the outer circle, twelve shot holes uniformly spaced along the circumference of the intermediate circle and six shot holes uniformly spaced along the circumference of the inner circle.

While we have found the specific circular pattern illustrated in the drawing to be relatively easily laid out in field practice, our invention is not limited to this specific form of pattern but may, if desired, be square, rectangular, or polygonal so long as the minimum length and breadth, or the minimum diameter, "A" of the area covered by the pattern is not less than about one-half the wavelength of longitudinal elastic waves which are propagated along near-vertical paths in the region being explored, and so long as the spacing "a" between adjacent shot holes along lateral lines crossing the pattern at as many different angles as practical is not greater than approximately the wavelength of high frequency seismic noise propagated along near-horizontal paths in said region.

As used herein the term "near-vertical paths" will be understood to designate propagation paths in the crust of the earth ranging between about forty-five and about ninety degrees with respect to a plane corresponding approximately to the earth's surface, and the term "near-horizontal paths" will be understood to designate propagation paths ranging between about zero and about forty-five degrees with respect to that plane.

We have found, as a result of extensive testing and the application of principles upon which our invention is based, that the three concentric circles of Figure 1 around which the pattern of shot holes are drilled may have radii of sixty; one hundred twenty, and one hundred eighty feet, and satisfactory results will be obtained in many difficultly-explorable geological regions.

In the practice of seismatic exploration methods of the prior art it has been usual practice to drill a single shot hole of considerable depth, sufficient to penetrate below the low velocity, weathered stratum at the surface of the earth and to place at the bottom of this hole a charge of explosive having a size suited to lithological conditions in the region undergoing exploration. We have found in the practice of our invention that the plural shot holes 12 need not necessarily penetrate through the weathered layer but may be drilled to uniform depths in the range of about six to twenty feet. Small charges of explosive, preferably of approximately equal sizes, are then placed adjacent the bottoms of the several holes. In general, the sum of the sizes of all the charges will be approximately equal to the size of the charge normally used in the particular region when employing conventional methods of the prior art. All of the charges in the shot holes 12 are provided with conventional detonating means, but these means are arranged so that all of the charges may be detonated substantially simultaneously at a selected time.

The numerals 13, 14, 15, and 16 in Figure 1 designate the positions of centers of a plurality of areas for reception of seismic waves. Although four such centers, with a reception area surrounding each center, are shown spaced along a straight line passing through disturbance center 11, any desired number of such reception centers and areas may be employed and these may be arranged around disturbance center 11 in any manner suited to a basic plan of exploration. Furthermore, the spacing between adjacent centers of reception, such as 13—14, and the distance from center 11 to the nearest center of reception may be any selected distances. In a preferred embodiment of our invention, we may employ eight areas of reception with four of the areas being spaced three hundred feet apart, center to center, along a chosen profile line on one side of the center of disturbance and with four other areas similarly spaced along the profile line on the opposite side of the disturbance center. The distances from the center 11 to the adjacent centers 14 and 15, in our preferred embodiment may also be three hundred feet.

Symmetrically placed and substantially uniformly spaced upon the surface of the earth throughout each of the specific reception areas surrounding centers 13, 14, 15, and 16 are planted composite groups of geophones, or seismic detectors, represented in Figure 1 by groups of tiny triangles 17. The individual composite groups of geophones may be referred to hereinafter and in the appended claims as "areal arrays" and the centers 13, 14, 15, and 16 may be referred to as "array centers," or, more broadly, as "centers of reception."

The geophones within each areal array may be planted in any convenient manner which will effectively cover the reception area surrounding its respective array center. Each array may cover a circular, square, rectangular, or polygonal area but it is desirable that the several arrays should be mutually similar as to size and arrangement. As shown in Figure 1, areas covered by adjacent arrays may overlap if desired but, in such instances, where mention is made herein relative to all of the geophones in a given reception area, this will be understood to refer to all geophones directly associated with a particular array or reception center.

In accordance with our invention, it is necessary that the minimum length and breadth, or the minimum diameter, "B" of the area covered by geophones in the respective arrays shall be equal to, or greater than one-half the wavelength of longitudinal elastic waves propagated along near-vertical paths in the region being explored. It is also necessary that the spacing "b" between adjacent geophones forming each array shall not be greater than approximately the wavelength of high frequency longitudinal elastic waves propagated along near-horizontal paths in said region. Accordingly it is desirable that the geophones within each array should be symmetrically arranged along uniformly spaced lateral lines, in the case of noncircular geometric arrays, as indicated in the modified form of array shown in Figure 1A, or along symmetrical radial lines or concentric circles, in the case of circular geometric arrays, as indicated in Figure 1. By aligning geophones along substantially straight lines in as many directions as practical from the array center, attenuation of seismic noise, and particularly those noise components which are propagated along near-horizontal paths, is achieved.

A preferred form of geophone array which has been found useful in the practice of our invention in many difficultly-explorable geological regions, such as the Edwards Plateau region of Texas, is shown diagrammatically in Figure 1. In this preferred embodiment of our invention, geophones are planted along each of eight radial lines. The several lines radiate symmetrically from the respective array centers and define angles of forty-five degrees therebetween. This form of array may be described as an eight pointed star. Each radial line is 210 feet long thereby making the diameter of the array 420 feet. One geophone is placed at the outer end of each radial line and other geophones are placed at successive thirty foot distances inwardly toward the array center.

Experience has shown, however, that a geophone at the array center and one geophone on each radial line which might normally be placed thirty feet from the center may be omitted from symmetrical arrays of the preferred form without adversely affecting the results obtained therewith. Only six geophones per radial line, or forty-eight geophones per array, are therefore employed to cover substantially uniformly a reception area slightly larger than three acres.

In accordance with our invention, all of the geophones which are grouped in each array are connected together by suitable pairs of insulated conductors, such as 18 in Figures 1 and 1A, in electrically additive polarity; that is, in a manner such that, when a given impulse of seismic energy arrives at one of the geophones in a particular array and causes said geophone to generate an electrical signal having a certain initial polarity, it will, upon arrival at the other geophones in that array, also cause each of these other geophones to generate an electrical signal having the same initial polarity. Thus, the geophones within each array may be mutually connected in series, in parallel, or in series-parallel relation to provide a single reception channel adapted to match a desired amplifier input impedance so long as proper observance of polarity is maintained.

It will be apparent that the phases of the electrical signals produced by the several geophones in a given array may or may not be substantially alike at any given instant depending upon the direction and distance to the source of the seismic impulse which produces the signal and the distances separating the geophones within the array. It will also be evident that the amplitude of the combined signal produced by the array will be the vectorial sum of the amplitudes of the signals produced by the several geophones within the array. Thus, if a seismic impulse of a certain wavelength approaches an areal array having, for example, a diameter of one-half that wavelength along a path which is many wavelengths long and which is perpendicular at the midpoint of the plane occupied by the array, it will reach all of the geophones nearly simultaneously. Consequently the signals produced by all of the geophones will be substantially in phase and the net amplitude of the signal derived from the array will be nearly equal to the sum of the amplitudes of the several individual geophone signals. On the other hand, if the seismic impulse approaches the above-mentioned areal array along a horizontal propagation path of similar length and lying within the plane occupied by the array, geophones on opposite sides of the array along the propagation path will respond to the impulse at different times, the phases of signals produced by these geophones may be as much as 180 degrees out of phase, and the net amplitude of the signal derived from the array will be considerably attenuated.

Each of the areal arrays of geophones which are planted around centers 13–16, inclusive, are electrically connected through cables 19—22, respectively, containing suitable pairs of insulated conductors, to separate amplifier channels 23—26, respectively, and thence to a recording means 27. Amplifier channels 23—26 may be conventional electronic amplifiers, including suitable band-pass filter means, all of which are well known to workers in the art. Recorder 27 may be a conventional recording oscillograph adapted to record as separate traces upon a moving strip the amplified output signals from amplifiers 23—26.

Referring now to Figures 2 and 3, there are shown reproductions of two seismic records produced along a common profile line and at the same shot hole station along said line. The record of Figure 2 was obtained by a conventional method of the prior art while the record of Figure 3 was obtained in accordance with the method of the present invention. A procedure for determining the minimum dimensions "A" and "B" and the maximum spacings "a" and "b" of Figure 1 will be explained with reference to data appearing in Figure 2, and a comparison of the records of Figures 2 and 3 will illustrate some of the advantages obtainable by practice of the present invention.

The artificial seismic disturbance employed to produce the record of Figure 2 consisted of 140 pounds of dynamite placed in the bottom fifteen feet of a shot hole which had been drilled to a depth of 255 feet below the surface of the earth. The energy produced by the disturbance was recorded by an up-hole geophone planted upon the surface of the earth adjacent the upper end of the shot hole, and by twelve separate reception channels of geophones aligned along the profile line with six channels on one side of the shot hole and six channels on the other side thereof. Each reception channel contained twelve geophones connected in electrically additive polarity and spaced in line thirty feet apart along the profile line. The center of the first reception channel, each side of the shot hole, was spaced 200 feet from the shot hole and the centers of successive channels thereafter were spaced 200 feet from the preceding channel center. The composite output from each of the spaced groups, or channels, of geophones were fed separately through a bank of conventional electronic amplifiers to separate mirror galvanometers in a conventional recording oscillograph. The six groups of geophones upon one side of the shot hole produced the traces 30, 31, 32, 33, 34, and 35 (numbered in increasing order with increasing distance of the channel from the shot hole), while the six groups of geophones upon the other side of the shot hole generated the traces 36–41, inclusive (numbered in similar increasing order).

During approximately the first six one-hundredths of a second the galvanometer which recorded trace 35 was electrically connected to the cap line employed to detonate the dynamite charge so that a record of the shot instant 42 could be made. Thereafter, at the instant 43, this galvanometer was automatically switched to record the output of geophone channel 35. Similarly, the galvanometer which produced the trace 34 was connected to the up-hole geophone during approximately the first six one-hundredths of a second (sufficient to record the up-hole "kick" 44) and was thereafter automatically switched to record the output of geophone channel 34.

In Figure 2 the parallel lines running transversely across the record correspond to $\frac{1}{100}$ second timing indicia conventionally applied thereto during the recording of the traces 30–41, inclusive. Numerals indicative of approximate time after the shot instant 42 have been applied above each tenth timing line for convenience of reference. The trace designated by the numeral 45 has no bearing upon the present invention and accordingly will not be discussed herein.

It may be seen from Figure 2 that, between the shot instant 42 and the time of the "first kick" 44 of the up-hole geophone, a time interval of .028 second elapsed. From this time interval and the known depth (240 feet) to the top of the dynamite in the shot hole it may be estimated that the average velocity of propagation "$v$" of longitudinal elastic waves in the surface layer adjacent the shot hole, in the region where the record of Figure 2 was obtained was approximately 8570 feet per second. Similarly, from the period of time elapsed between the "first kicks," such as indicated by the numerals 46 and 47, of the geophone groups spaced from the shot hole and the known distance between these groups of geophones, it may be calculated that the average velocity "$V$" of propagation of longitudinal elastic waves in strata at the depth of the shot hole, i. e. in a stratum below the weathered or surface layer, was approximately 16,000 feet per second. Values for velocities of propagation obtained in this way or, preferably, average values obtained by similar test shots at several points in the region undergoing exploration, may be used in determining the size and spacing of shot hole patterns and geophone arrays in accordance with our invention as will be explained more fully hereinafter. Alternatively, average values of "v" and "V" may be determined, in well known manner, by direct velocity measurements in boreholes in the region being explored.

From a careful inspection of the record of Figure 2, a skilled worker will see that very few, if any, good seismic events indicative of subsurface reflections appear therein. It may be noted, however, that the "valleys" designated approximately by the interval 48—49 line up approximately across the record and suggest that a reflection event might be present even though trace 41 does not precisely line up at this point. Similarly, the "valleys" designated approximately by the interval 50—51 designate another possible event in which all of the traces do not line up sufficiently accurately.

In accordance with our invention, we estimate the average frequency "f," characteristic of reflection events in the region being explored, by noting the times, such as denoted by the intervals 48—49 and 50—51, for one-half cycle of possible reflection events at a plurality of places throughout the length of one or more preliminary records and averaging the frequencies calculated therefrom. The intervals 48—49 and 50—51 correspond to frequencies of about 28 and 35 cycles per second, respectively, or an average of about 31 cycles per second.

Careful observation throughout extensive investigations conducted by us have shown that high frequency responses such as 52, 53, 54 and 55, particularly when they appear in quasi-aligned relation across several traces of a preliminary record, are usually indicative of disturbing high frequency seismic noise. In accordance with the practice of our invention, we estimate the average frequency "F" of high frequency noise components from responses such as 52—55 at a large number of points throughout one or, preferably, several preliminary records obtained in the region to be explored. In the illustrated example the average frequency "F" of the responses 52—55, inclusive, is approximately 65 cycles per second.

To determine the minimum shot hole pattern dimension "A" or the minimum geophone array dimension "B" of Figure 1, we determine the approximate wavelength of seismic reflection events in the geological region undergoing exploration by dividing the above described average value of "V" by the average value of "f." Similarly, to determine the maximum spacing "a" of shot holes in the pattern and the maximum spacing "b" of geophone along radial or lateral lines in each geophone array, we determine the wavelength of seismic noise components by dividing the average velocity "v" by the average frequency "F." We have found that if the minimum dimensions "A" and "B" are equal to, or greater than about one-half the wavelength of reflection events, and if the maximum spacings "a" and "b" are equal to, or less than, approximately the wavelength of high frequency seismic noise components, improved results will be obtained. Thus, "A" and "B" are equal to or greater than $$\frac{V}{2f}$$

and "a" and "b" are equal to or less than $$\frac{v}{F}$$

From the averaged values of "v," "V," "f," and "F" determined from Figure 2, the following minimum dimensions and maximum spacings might suitably be employed in the practice of our invention in the particular geographical region where the record of Figure 2 was obtained. A and B equal to or greater than $$\frac{V}{2f} = \frac{16,000}{2 \times 31} = 260 \text{ feet}$$

a and b equal to or less than $$\frac{v}{F} = \frac{8570}{65} = 132 \text{ feet}$$

While our invention does not contemplate a specific upper limit to the dimensions "A" and "B" or a specific lower limit to the spacings "a" and "b," practical field operating conditions dictate that the former will ordinarily not be greatly in excess of about four times the values determined in the above indicated manner, and the latter will ordinarily not be substantially less than about one-tenth the calculated values.

As mentioned hereinbefore, the record reproduced in Figure 3 was obtained at the same shot hole station and along the same profile, or exploration, line as the record of Figure 2. However, in the production of the record of Figure 3, ninety-five pounds of dynamite was divided into thirty-six substantially equal sized charges which were placed at the bottom of thirty-six ten-foot deep shot holes drilled around the shot hole station in accordance with the preferred pattern shown in Figure 1. The diameter of the outer circle of the pattern was three hundred sixty feet, that of the intermediate circle was two hundred forty feet and the diameter of the inner circle was one hundred twenty feet. All of the charges were detonated simultaneously.

The seismic wave detection system employed to obtain the record of Figure 3 included eight areal arrays of geophones planted upon the surface of the earth around reception centers spaced three hundred feet apart along the profile line with four arrays being upon one side of the shot hole pattern and four arrays being upon the other side of said pattern. The centers of the geophone arrays nearest to the shot hole pattern were spaced three hundred feet from the center thereof. Each of the geophone arrays consisted of forty-eight geophones arranged in an eight-pointed star as shown in Figure 1. Each radial line was two hundred ten feet long and contained six geophones spaced thirty feet apart beginning at the outer end of the radial. All of the geophones were connected in electrically additive polarity and the electrical output derived from each array was fed through a separate electronic amplifier to a separate galvanometer in a conventional recording oscillograph. The traces produced by the four arrays arranged upon one side of the seismic disturbance center are identified by the numerals 56, 57, 58, and 59 (in increasing order with increasing distance from the disturbance center) while the traces produced by the other four arrays are identified by the numerals 60, 61, 62, and 63 in Figure 3. The trace 64 has no bearing upon the present invention and will not be discussed further herein. A single geophone, analogous to the up-hole geophone mentioned in connection with Figure 2, was placed at the center of the shot hole pattern and the signal therefrom, during approximately the first six one-hundredths of a second, was fed to the galvanometer which produced the trace 58. Thereafter, this galvanometer was switched to one of the outer geophone arrays.

Similar to the system employed to produce the record of Figure 2, the galvanometer which recorded the trace 59 was first connected to the cap line that was used to detonate the charges of explosive in order to record the shot instant 65 and was thereafter automatically switched to record the seismic events received by one of the outer arrays of geophones.

An inspection of Figure 3 and a comparison thereof with Figure 2 shows some of the improved results obtainable with the system and by the method of the present invention. Thus, the timing and character of seismic reflection events, a few of which are denoted by the reference numerals 66—75, inclusive, may be recognized by workers in the art as indicative of the depth of subsurface discontinuities or geological structure. A major portion of these events are not discernible in the record of Figure 2 despite the fact that both records were made at the same shot point station and along the same exploration profile line.

A further illustration of the improved results obtainable by the method and system of the present invention is shown by a comparison of Figures 4 and 5. Similar to Figures 2 and 3, Figures 4 and 5 are reproductions of test records obtained in the Edwards Plateau region of Texas. Both of the records reproduced in Figures 4 and 5 were obtained with identical recording elements at identical places, the only difference being that the record of Figure 4 resulted from the detonation of a single fifty-pound charge of dynamite placed at the bottom of a two hundred ninety-one foot hole oriented, with respect to areal arrays of geophones, at a position corresponding to the disturbance center 11 shown in Figure 1, while the record of Figure 5 resulted from the simultaneous detonation of thirty-six one-pound charges of dynamite placed at the bottoms of thirty-six shot holes, each drilled to a depth of ten feet, spaced over a circular area as shown in Figure 1. The diameter of the outer circle of shot holes was three hundred sixty feet, that of the intermediate circle was two hundred forty feet, and the inner circle had a diameter of one hundred twenty feet.

Each of the eight geophone arrays employed in recording Figures 4 and 5 consisted of forty-eight geophones planted upon the surface of the earth and forming an eight pointed star as shown in Figure 1. The radial length of each array was two hundred ten feet and the geophones were spaced thirty feet apart along the radial lines. The array centers were spaced three hundred feet apart and the center of arrays nearest the disturbance center were three hundred feet therefrom.

An "up-hole" geophone was placed adjacent the mouth of the single shot hole employed when recording the seismogram, or record, of Figure 4. This geophone was not moved prior to recording the seismogram of Figure 5 and, accordingly, this "up-hole" geophone actually was adjacent the center of the shot hole pattern. Similar to the records of Figures 2 and 3, the shot instant in Figures 4 and 5 was recorded by the galvanometer which recorded the top trace and the "up-hole" time was recorded by the galvanometer which produced the second-from-the-top trace. Thereafter these galvanometers were quickly switched to record events received by the outer arrays of geophones.

It may be seen from Figure 4 that substantially no usable seismic reflection events were recorded by the areal arrays of geophones when a single concentrated transient disturbance was produced. On the other hand, as shown by Figure 5, when a seismic disturbance was simultaneously produced throughout an area having a minimum dimension comparable to a half-wavelength of reflected waves and the energy from the disturbance was detected over spaced areas having minimum dimensions of similar size, pronounced seismic reflection events were detected at about 0.7–0.75 second, 0.9–0.93 second, and 1.02–1.06 second after the shot instant.

Having fully described and illustrated the method and a system suitable for use in the practice of our invention, what we wish to claim as new and useful and to secure by Letters Patent is:

1. A system for seismic exploration of geological formations beneath the surface of the earth which comprises a plurality of charges of explosive planted beneath the surface of the earth to form an areal pattern, said pattern comprising said charges spaced substantially uniformly and circumferentially around first, second and third concentric circles having a common center which defines a center of seismic disturbance, said first circle being approximately 120 feet in diameter and having six of said charges, said second circle being approximately 240 feet in diameter and having 12 of said charges, and said third circle being approximately 360 feet in diameter and having 18 of said charges therearound; means for detonating all of said charges substantially simultaneously at a selected time; a plurality of geophones planted upon the surface of the earth to form eight areal arrays each having an array center, the resulting array centers being spaced upon the surface of the earth at successive approximately 300 foot distances along a selected line, each of said arrays comprising geophones spaced along eight substantially uniformly spaced radial lines radiating from its respective array center, each of said radial lines being approximately 210 feet long, as measured outwardly from the array center, and having six geophones spaced approximately at successive 30 foot distances beginning at the outer end thereof; means for connecting all of the geophones in each of the respective arrays in electrically additive polarity to form one reception channel per areal array; and means for recording seismic waves received by each of the resulting reception channels.

2. A system in accordance with claim 1 wherein said selected line is substantially a straight line passing through said center of seismic disturbance and wherein one-half of the total number of arrays are oriented upon one side and the other half thereof are oriented upon an opposite side of said center of seismic disturbance.

3. A system for seismic exploration of geological formations beneath the surface of the earth which comprises an areal shot pattern consisting of a plurality of charges of explosive buried in the earth at substantially uniformly spaced-apart points along the circumferences of a plurality of concentric circles, the largest of which circles has a diameter of at least a value represented by $$\frac{V}{2f}$$

and the maximum spacing between adjacent charges within said shot pattern being not substantially more than a value represented by $$\frac{v}{F}$$

wherein $v$ and $V$ are predetermined values, respectively, for the average velocity of propagation of longitudinal elastic waves in the surface layer and for the average velocity of propagation of said waves in consolidated layers below said surface layer in the region undergoing exploration, and wherein $f$ is a predetermined average frequency of seismic reflection waves and $F$ is a predetermined average frequency of substantially the highest frequency seismic noise waves characteristically propagated in earth formations in said region; means for detonating all of said charges of explosive substantially simultaneously at a selected time; at least one areal array comprising a plurality of geophones planted upon the surface of the earth, said geophones in said array being spaced along each of a plurality of radial lines which radiate substantially uniformly around a selected center of seismic wave reception, the radial lengths of all of said radial lines being substantially equal and at least a value represented by one-half said $$\frac{V}{2f}$$

and the maximum spacing between said spaced-apart geophones being not substantially more than said value represented by $$\frac{v}{F}$$

means connecting all of the geophones in said areal receiving array in electrically additive polarity; and means for recording a function characteristic of the wave output of said array.

(References on following page)

References Cited in the file of this patent

UNITED STATES PATENTS

| | | |
|---|---|---|
| 2,473,469 | Dahm | June 14, 1949 |
| 2,545,380 | Poulter | Mar. 13, 1951 |
| 2,580,636 | Wolf | Jan. 1, 1952 |
| 2,615,523 | Poulter | Oct. 28, 1952 |
| 2,642,146 | Woods | June 16, 1953 |
| 2,678,107 | Woods | May 11, 1954 |

FOREIGN PATENTS

| | | |
|---|---|---|
| 521,573 | Germany | Mar. 24, 1931 |